Patented Jan. 25, 1944

2,340,112

UNITED STATES PATENT OFFICE 2,340,112

DERIVATIVES OF BLOWN FATTY AMIDES

Gifford D. Davis, South Orange, and William L. Abramowitz, Lakewood, N. J., assignors to National Oil Products Company, Harrison, N. J., a corporation of New Jersey No Drawing. Application April 9, 1940,
Serial No. 328,684

14 Claims. (Cl. 260—401)

This invention relates to inorganic acid derivatives of unsaturated fatty amides, and more particularly to esters of blown fatty amides.

It is known that unsaturated fatty amides may be reacted with inorganic acids such as sulfuric acid or phosphoric acid to produce products having valuable properties; thus, for example, many of the sulfates and phosphates of unsaturated fatty amides possess valuable wetting and dispersing properties. However, such reaction products tend to become rancid and discolored upon exposure to oxidizing influences such as air. This tendency makes it disadvantageous to employ these products under conditions such that they are subjected to oxidizing influences; particularly it has been found that these products when exposed for prolonged periods of time to air become quite rancid and discolored and hence unfit for most commercial uses. Since there is a large and readily available supply of unsaturated fatty acids or derivatives thereof capable of being converted to unsaturated fatty amides, it would be economically desirable to utilize such amides to greater advantage than is at present possible.

It is the object of this invention to provide derivatives of unsaturated fatty amides and inorganic acids which are relatively permanently stable to oxidizing influences.

A more specific object of this invention is to prepare valuable wetting, dispersing and emulsifying agents from unsaturated fatty amides, which derivatives may be exposed to air without becoming rancid or discolored.

In accordance with our invention valuable derivatives of amides of unsaturated fatty acids, which derivatives have substantially no tendency to discolor or become rancid and which are relatively permanently stable to oxidizing influences, are produced by reacting an inorganic oxygen-containing acid or a derivative thereof capable of forming esters with a blown fatty amide composition comprising a blown amide of an unsaturated fatty acid. The blown fatty amide composition employed in accordance with our invention may be prepared by blowing a composition comprising an amide of an unsaturated fatty acid, or by first blowing an unsaturated fatty acid or a derivative thereof capable of reacting with amines to form amides, and then reacting the blown fatty acid compound with an amine so as to form the blown amide; we prefer to employ the latter method in the preparation of the blown amide composition. The preferred embodiment of our invention involves the preparation of sulfates of blown alkylolamides having fatty acid residues containing at least 8 carbon atoms; we have found that these sulfates have wetting, dispersing and emulsifying properties comparable to those of the sulfates of the corresponding unblown alkylolamides, but that they do not have the undesirable properties of becoming rancid and discolored when subjected to oxidizing influences.

The blown fatty amide compositions employed in accordance with our invention may be derived from any unsaturated fatty acid, or higher fatty acid susceptible to oxidation by blowing, but we prefer to employ blown amides derived from fatty acids containing at least 8 carbon atoms. Thus, for example, blown amides of coconut fatty acids, ricinoleic acid, oleic acid, sperm oil fatty acids, teaseed fatty acids and similar unsaturated fatty acids, or higher fatty acids susceptible to oxidation by blowing, may be employed. We prefer to employ blown alkylolamides of unsaturated fatty acids in accordance with our invention; thus blown amides formed by reaction of unsaturated fatty acids or their esters with monoethanolamine, diethanolamine, ethanol ethylene diamine and the like, are preferably employed. However, blown amides derived from amines such as ethylene diamine, diethylene triamine, tetra ethylene penta-amine or other amines may be employed, as well as primary amides formed by reaction of an unsaturated fatty acid and ammonia. It is to be understood that our invention contemplates the employment of mixtures of blown amides of unsaturated fatty acids, including mixtures containing appreciable amounts of other substances, such as saturated fatty amides, which do not detrimentally affect the character of the products of our invention; the term "blown fatty amide composition" employed throughout the specification and claims is thus intended to cover not only relatively pure blown amides, but also mixtures of the type above mentioned.

The blown fatty amide compositions may be prepared by contacting an amide of an unsaturated fatty acid with air, oxygen, ozone, or a mixture thereof. However, we prefer to prepare these compositions by first contacting an unsaturated fatty acid or a derivative thereof capable of reacting with amines to form amides with air, oxygen, ozone, or a mixture thereof, and then reacting the blown product with an appropriate amine or ammonia. The blowing is usually carried out by passing the oxidizing medium through a fluid mass or a solution of the substance to be treated; it may also be carried out by spraying the substance through a body of one of the above oxidizing media. The blowing treatment may be performed in the presence of catalysts such as, for example, metallic driers, peroxides and the like. The substance may advantageously be mixed prior to blowing with a relatively small amount of water, e. g., about 10%, to increase the hydroxyl content of the blown product. The time of blowing may vary widely depending upon the characteristics desired in the final product, but ordinarily between about 3 and about 48 hours are suitable. The blowing may be conducted at any desirable temperatures; preferably temperatures between about 75° C. and about 200° C. are employed. The resulting products may be purified by distillation or any other suitable method, if desired.

The blown amide compositions above described may then, in accordance with our invention, be reacted with an inorganic oxygen-containing acid or a derivative thereof capable of forming esters. The acid compound with which the blown composition is reacted may be any inorganic acid or derivative thereof capable of forming valuable esters. Thus, for example, if it is desired to produce a sulfate of the blown amide composition, the composition may be reacted with sulfuric acid, pyrosulfuric acid, or oleum. A phosphate may be produced by reaction with metaphosphoric acid or phosphorus pentoxide. Phosphorus trichloride may be employed to produce phosphites. If it is desired to prepare a borate, the blown fatty amide composition may be reacted with boric acid or other suitable boron derivatives; reaction with silicon tetrachloride or similar silicon compounds yields a silicate. Other oxygen-containing inorganic acids or derivatives thereof may also be employed to react with the blown amide composition to produce valuable reaction products.

The conditions of the reaction of the blown fatty amide composition with the oxygen-containing inorganic acid or derivative thereof may vary somewhat depending upon the particular reactants employed and upon the type of product desired. The reactants may be mixed directly or the reaction may be carried out in any suitable solvent. The presence of a dehydrating agent such as acetic anhydride or acetyl chloride may be advantageous. In general it may be said that the reaction may be carried out in accordance with any of the methods of esterification known to the art. The relative proportions of the reactants depend to a great extent upon the type of product desired. If a neutral ester is to be produced, a sufficient amount of the blown fatty amide composition should be used to react with substantially all of the acidic constituents of the acid. On the other hand, if it is desired to prepare acid esters, the proportions should be suitably controlled to effect this result by using an amount of blown fatty amide composition insufficient to react with all the acidic constituents of the acid. The actual amount of acid employed to produce the desired esters will vary somewhat depending upon the nature of the blown fatty amide composition. Thus, for example, if a blown alkylolamide of an unsaturated fatty acid is being treated with sulfuric acid, the amide will have a greater acid-reacting capacity because of the presence of the hydroxyl group than will an amide such as one prepared from ethylene diamine. One skilled in the art, in view of the disclosure, can thus easily adjust the proportion of reactants in order to obtain the desired results.

Acid esters prepared in accordance with our invention may be neutralized with alkali or alkaline earth compounds such as sodium, potassium or calcium hydroxide, or with compounds of other metals, such as magnesium, aluminum, copper, cobalt, nickel, iron, zinc and silver. The acid ester, if desired, may be neutralized with caustic soda or ammonia, and then reacted with a water-soluble metallic salt. Nitrogeneous bases such as ammonia, methylamine, monoethanolamine, tri-isopropylamine, triethanolamine, morpholine, pyridine, diethylene triamine, glucamine, and the like, may also be employed to neutralize the acid esters.

The products of our invention may be either solids or liquids depending upon the amount of water contained in the finished product. They usually have higher $SO_3$ contents than the corresponding unblown sulfated amides and hence show improved surface activity and increased resistance to precipitation upon contact with calcium and magnesium salts. Our novel products are either soluble or dispersible in water and show no tendency to become rancid even after prolonged exposure to atmospheric conditions. They may thus be employed for a wide variety of purposes, among which may be mentioned their use as detergents; as wetting, dispersing and emulsifying agents; as wool scouring agents; as textile treating agents; as frothing agents, etc. They may also be advantageously added to shampoos and similar cosmetic preparations, and may be used to de-gum silk and in ore flotation.

The following examples are illustrative of our invention; amounts are given in parts by weight.

*Example I*

250 parts of blown castor oil prepared by blowing air through castor oil for 15 hours at 150° C. were reacted with 51 parts of monoethanolamine at 150° C. for 14 hours with constant agitation. 100 parts of the resulting solid product were then melted and added to 100 parts of 20% oleum, the oleum being chilled to a temperature of about 5° C. The mass was then permitted to react for between about 30 and about 40 minutes, the temperature being maintained below 35° C. At the end of this time, ice was added to the mixture, the mass neutralized with a chilled sodium hydroxide solution, and the salt solution separated from the oily layer. The resulting product was mixed with water so as to form a solution containing 60% water, and the pH of the solution was adjusted to 6.1; this solution was a clear, red liquid.

*Example II*

350 parts of blown sperm oil prepared by blowing air through sperm oil for 15 hours at 140° C. were reacted with 50 parts of monoethanolamine at 150° C. for 14 hours with constant agitation. 100 parts of the resulting solid product were then sulfated and worked up as described in Example I, whereby a red liquid was obtained.

*Example III*

234 parts of blown coconut oil prepared by blowing air through coconut oil for 15 hours at 120° C. were reacted with 33 parts of monoethanolamine at 150° C. for 14 hours with constant agitation. 100 parts of the resulting solid product where then sulfated and worked up as described in Example I, whereby a brown liquid was obtained.

Example IV 295 parts of blown teaseed oil prepared by blowing air through teaseed oil for 48 hours at a temperature between about 110° C. and about 125° C. were condensed with 61 parts of monoethanolamine at 150° C. for 14 hours with constant agitation. 100 parts of the resulting solid product were then sulfated and worked up as in Example I, whereby a brown paste resulted.

Example V 100 parts of the amide formed by reacting blown coconut oil prepared as above described with diethanolamine at 150° C. for 8 hours were mixed with 200 parts of concentrated sulfuric acid and 100 parts of 20% oleum. The mass was then agitated for 2 hours at 50° C. The resulting product was neutralized with sodium hydroxide containing a small amount of isopropanol. The salt solution was then separated from the oily layer and the pH of the product adjusted to 6.5.

Example VI 100 parts of an amide prepared by reacting blown coconut oil prepared as above described and ethanol ethylene diamine at 150° C. for 8 hours were melted and sulfated and worked up as described in Example I, whereby a paste soluble in water was obtained.

Example VII 100 parts of an amide formed by reacting blown coconut oil prepared as above described and diethylene triamine at 150° C. for 8 hours, and then treating the product with a molecular proportion of acetic acid were melted and sulfated and worked up as in Example I, whereby a firm paste was obtained.

Example VIII 100 parts of blown castor oil monoethanolamide prepared as described in Example I were melted and 100 parts of metaphosphoric acid were gradually added to the melt, the temperature being maintained between 50° and 55° C. When the reaction was complete, ice was added to the mass and the chilled mixture then neutralized with sodium hydroxide, the temperature being maintained below 35° C.

Example IX 100 parts of castor oil monoethanolamide prepared by reacting castor oil with monoethanolamine at 150° C. for 14 hours were blown with air for 15 hours at 150° C. The resulting product was then sulfated and worked up as described in Example I.

From the above description it will be evident that our invention provides a series of novel products having properties which will make them extremely valuable for use in a wide variety of fields. Hence our invention will be of great interest to those engaged in the manufacture of surface active compounds.

It is to be understood the terms "sulfate, phosphate" and similar terms are used in the specification and claims to denote both the unneutralized esters obtained by reacting the blown fatty amide composition with the corresponding inorganic oxygen-containing acid and the products obtained by neutralizing these esters.

Since certain changes in carrying out the above process and certain modifications in the products which embody the invention may be made without departing from its scope, it is intended that all matter contained in the above description shall be interpreted as illustrative and not in a limiting sense.

Having described our invention, what we claim as new and desire to secure by Letters Patent is:

1. A process for preparing sulfates of blown fatty amide compositions, which comprises blowing a compound selected from the group consisting of unsaturated fatty acids containing at least 8 carbon atoms and derivatives thereof capable of reacting with amines to form amides, reacting the blown compound with an amine to form an amide, and sulfating the amide thus formed.

2. A process for preparing sulfates of blown fatty amide compositions, which comprises blowing a compound selected from the group consisting of unsaturated fatty acids containing at least 8 carbon atoms and derivatives thereof capable of reacting with amines to form amides, reacting the blown compound with an alkylolamine to form an alkylolamide, and sulfating the alkylolamide thus formed.

3. As a new chemical product, an inorganic oxygen-containing acid ester of a blown fatty amide having a fatty acid residue containing at least 8 carbon atoms.

4. As a new chemical product, an inorganic oxygen-containing acid ester of a blown fatty alkylolamide having a fatty acid residue containing at least 8 carbon atoms.

5. As a new chemical product, a sulfate of a blown fatty amide having a fatty acid residue containing at least 8 carbon atoms.

6. As a new chemical product, a sulfate of a blown fatty alkylolamide having a fatty acid residue containing at least 8 carbon atoms.

7. As a new chemical product, a water-soluble salt of an inorganic oxygen-containing acid ester of a blown fatty amide having a fatty acid residue containing at least 8 carbon atoms.

8. As a new chemical product, a water-soluble salt of an inorganic oxygen-containing acid ester of a blown fatty alkylolamide having a fatty acid residue containing at least 8 carbon atoms.

9. As a new chemical product, a water-soluble salt of a sulfate of a blown fatty amide having a fatty acid residue containing at least 8 carbon atoms.

10. As a new chemical product, a water-soluble salt of a phosphate of a blown fatty amide having a fatty acid residue containing at least 8 carbon atoms.

11. As a new chemical product, a water-soluble salt of a phosphate of a blown fatty alkylolamide having a fatty acid residue containing at least 8 carbon atoms.

12. As a new chemical product, an alkali metal salt of a phosphate of a blown fatty amide having a fatty acid residue containing at least 8 carbon atoms.

13. As a new chemical product, an alkali metal salt of a phosphate of a blown fatty alkylolamide having a fatty acid residue containing at least 8 carbon atoms.

14. As a new chemical product, an alkali metal salt of a phosphate of a blown fatty monoethanolamide having a fatty acid residue containing at least 8 carbon atoms.

GIFFORD D. DAVIS.
WILLIAM L. ABRAMOWITZ.